(No Model.)

T. B. NUTTING, Sr.
CAR COUPLING.

No. 320,388. Patented June 16, 1885.

WITNESSES:
Chas. Nida
C. Sedgwick

INVENTOR:
T. B. Nutting Sr
BY Munn &Co
ATTORNEYS.

N. PETERS, Photo-Lithographer, Washington, D. C.

UNITED STATES PATENT OFFICE.

THOMAS B. NUTTING, SR., OF MORRISTOWN, NEW JERSEY, ASSIGNOR TO HIMSELF, AND THOMAS B. NUTTING, JR., OF NEW YORK, N. Y.

CAR-COUPLING.

SPECIFICATION forming part of Letters Patent No. 320,388, dated June 16, 1885.

Application filed March 6, 1885. (No model.)

*To all whom it may concern:*

Be it known that I, THOMAS B. NUTTING, Sr., of Morristown, in the county of Morris and State of New Jersey, have invented a new and useful Improvement in Car-Couplings, of which the following is a full, clear, and exact description.

Reference is to be had to the accompanying drawings, forming a part of this specification, in which similar letters of reference indicate corresponding parts in all the figures.

Figure 1:
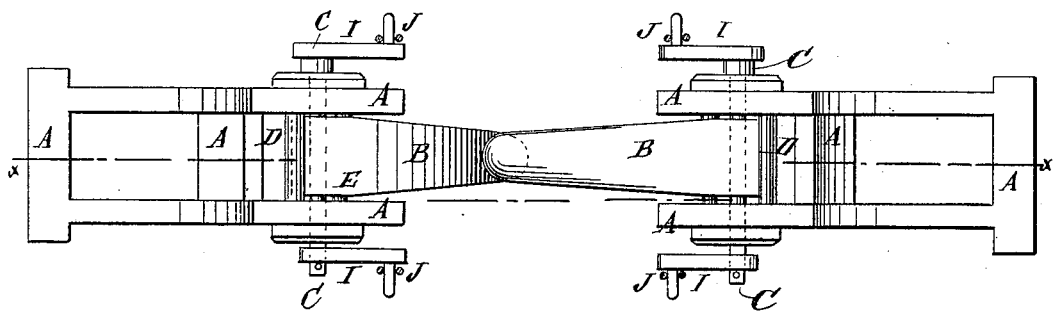
Figure 2:
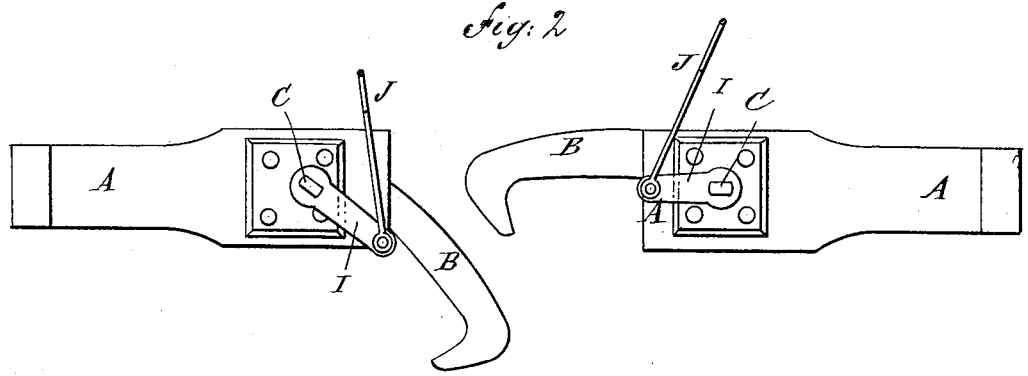
Figure 3:
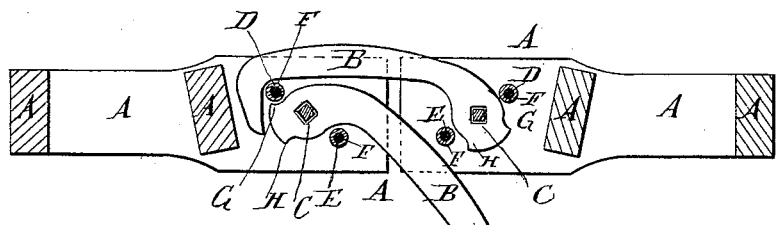
Figure 4:
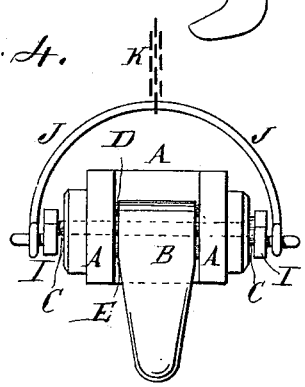

Figure 1 is a plan view of one of my improved car-couplings, shown in position for coupling. Fig. 2 is a side elevation of the same. Fig. 3 is a sectional side elevation of the same, taken through the line $x\ x$, Fig. 1, and shown coupled. Fig. 4 is a front elevation of one part of the coupling.

The object of this invention is to provide car-couplings constructed in such a manner that the cars will be coupled automatically when they are run together and can be readily uncoupled, and which shall be simple in construction and reliable in use.

The invention relates to a car-coupling constructed with draw-heads having hooks provided with shoulders upon their rear ends, and hinged to the said draw-heads by bolts and limited in their movements by other bolts, the hinging-bolts being provided with cranks and a bail and chain, whereby the cars will be coupled automatically when run together, and can be readily uncoupled, as will be hereinafter fully described and then claimed.

A represents the draw-heads of a car-coupling, each of which is formed of two side bars connected at their rear ends and middle parts by cross-bars, as shown in Figs. 1 and 3, and which may be formed in one piece or in separate pieces bolted or otherwise secured to each other. To each draw-head, near its forward end, is hinged a coupling-hook, B, by a bolt, C, passing through the said draw-head and through the rear end of the said hook. The part of the bolt C that passes through the end of the hook B and the hole through the said end of the hook are made square, and the parts of the said bolt that pass through the draw-bar are made round, so that the free end of the hook can be raised and lowered by turning the said bolt. Each draw-head A is provided with a second bolt, D, placed above and a little in the rear of the bolt C, and with a third bolt, E, placed below and a little in front of the said bolt C, as shown in Fig. 3.

Upon each of the bolts D E is placed a tubular washer, F, to lessen the friction and wear upon the said bolts.

Upon the rear end of each hook B are formed two shoulders, G H, which, by coming in contact, respectively, with the bolts D E, limit the downward and upward movement of the said hooks. The free ends and the upper sides of the hooks B are rounded, so that when the cars are run together one of the said hooks will slide over the other and drop over the bolt D, coupling the cars.

To the ends of the bolt C are attached small cranks I, so that the said bolt can be readily turned to uncouple the cars. To the cranks I are attached the ends of a bail, J, to the middle part of which is attached the end of a chain, K, which is designed to be extended to the platform or the top of the car, so that the hook B can be raised to uncouple the cars by operating the said chain.

The coupling thus described is simple in construction and inexpensive in manufacture, and at the same time has great strength and durability.

With this construction cars of different heights, when run together, will be coupled automatically with the same certainty as cars of the same height.

Having thus fully described my invention, I claim as new and desire to secure by Letters Patent—

1. In a car-coupling, the combination, with the draw-head A, of the hook B, having projecting shoulders G H upon its rear end, the hinging-bolt C, and the stop-bolts D E, for the said shoulders G H to engage with, substantially as herein shown and described, whereby the cars will couple themselves when run together, as set forth.

2. In a car-coupling, the combination, with the draw-head A, the coupling-hook B, the hinging-bolt C, and the cranks I, of the bail J and the chain K, substantially as herein shown and described, whereby the said coupling-hook can be readily raised from the platform or top of the car to uncouple the cars, as set forth.

3. In a car-coupling, the hooks B, made substantially as herein shown and described, with their free ends and upper sides rounded, to adapt one hook to slide over the other when the cars are run together, and thus couple the said cars automatically, as set forth.

THOMAS B. NUTTING, Sr.

Witnesses:
JAMES T. GRAHAM,
C. SEDGWICK.